United States Patent Office 3,730,745
Patented May 1, 1973

3,730,745
METHOD FOR CASTING OF PLASTER PRODUCTS
Birger Rustan, Drammen, Norway, assignor to
B. Rustan A/S, Drammen, Norway
No Drawing. Filed July 2, 1970, Ser. No. 52,085
Claims priority, application Norway, July 7, 1969,
2,847/69
Int. Cl. C04b 11/00
U.S. Cl. 106—110                                     2 Claims

ABSTRACT OF THE DISCLOSURE

It is known to cast plaster products, and it is further known that moulds used for this casting have to be cleaned very frequently or provided with mould release agents to prevent the plaster from adhering to the mould walls. According to the invention this problem of adhesion to the mould walls is solved by adding hydrogen peroxide to the aqueous plaster composition used for casting.

This invention relates to a method for casting of plaster products.

The term "plaster products" as used herein comprises products containing substantial amounts of plaster. In addition to plaster they may for instance also contain other particulate or fibrous substances such as sand and glass fibres respectively.

A problem encountered in the casting of plaster products in moulds is that the moulds have to be cleaned and/or provided with mould release agents after having been used once or a few times. If the moulds are not cleaned or provided with mould release agents products are obtained which do not completely have the desired shape since some of the plaster will remain adhered to the mould or the product will be uneven, with uneven parts corresponding to impurities in the mould.

According to the invention is provided a method of improving the liberation of the solidified products from the moulds in the casting of plaster products from an aqueous plaster-containing composition consisting of water, plaster and, if desired, fillers. The method is characterized by adding to the aqueous composition hydrogen peroxide in an amount of from 0.01 to 0.5%, preferably 0.02 to 0.2%, based on the weight of the water in the aqueous composition, without adding any type of catalyst. The type of catalyst which is particularly contemplated is the type which decomposes hydrogen peroxide.

The cast products will then correspond exactly to the mould (which may be made of all conceivable mould materials) without the necessity for any type of lubrication of the moulds in advance with mould release agent. The moulds do not need any cleaning after the casting. They stay clean and are ready for another casting. A possible unclean mould will even be cleaner after a casting. Further, considerable savings of the drying expenses are obtained by using plaster compositions containing hydrogen peroxide, since it is then possible to expel, for instance already during the solidification of the composition, about 10% of the water which it is desired to dry away.

If too small amounts of hydrogen peroxide are used, no effect will be obtained, and if too large amounts are used, the products may be blown apart. A suitable amount is for instance present in a composition containing 1.3 kg. of plaster powder, 0.8 liter of water and 0.2 liter of 3.5% hydrogen-peroxide. The suitable amount of hydrogen peroxide will vary particularly according to the amount of water and also according to the amount of plaster and partly according to the type and amount of other substances present in the aqueous plaster composition. For the casting of plaster is normally used a ratio by weight of plaster/water of from 1.1 to 1.8.

In the following table is illustrated the amount of water expelled and the weight before drying for various compositions containing different amounts of hydrogen peroxide.

| Compositions | Water expelled, ml. | Weight before drying, g. | Remarks |
|---|---|---|---|
| 1.. 100 ml. $H_2O_2$, 3.5%, 160 g. plaster.... | 0 | 229.3 | Strong blowing. |
| 2.. 100 ml. $H_2O_2$, 0.875%, 160 g. plaster.. | 10 | 228.6 | Little blowing. |
| 3.. 100 ml. $H_2O_2$, 0.44%, 160 g. plaster... | 8 | 229.0 | |
| 4.. 100 ml. $H_2O_2$, 0.22%, 160 g. plaster... | 4 | 233.0 | |
| 5.. 100 ml. $H_2O_2$, 0.11%, 160 g. plaster... | 6 | 232.15 | |
| 6.. 100 ml. $H_2O_2$, 0.055%, 160 g. plaster.. | 2.5 | 236.25 | |
| 7.. 100 ml. $H_2O_2$, 0.027%, 160 g. plaster.. | 1 | 236.9 | |
| 8.. 100 ml. $H_2O_2$, 0.014%, 160 g. plaster.. | 0.5 | 239.8 | |
| 9.. 100 ml. $H_2O_2$, 0.007%, 160 g. plaster.. | (a) | 242.7 | |
| 10. 100 ml. $H_2O$, 160 g. plaster.......... | 0 | 242.77 | | a Difficult to measure.

The difference between the weight of the composition and the weight before drying+expelled water is water evaporated by the heat of reaction during the solidification.

All the compositions 1 to 9 were easily released from the mould (carton), while composition 10 gave residues of plaster on the mould.

In the foregoing compositions the plaster employed was plaster of Paris or calcium sulphate hemihydrate. It will be apparent to the art skilled from the specification that other plaster materials can be used which have properties similar to those of plaster of Paris.

What is claimed is:

1. A method of improving liberation of solidified products from molds utilized in casting of plaster products from an aqueous plaster-containing composition, which comprises adding to the aqueous plaster composition hydrogen peroxide in an amount of from 0.01 to 0.5%, based on the weight of the water in the composition, in the absence of any catalyst.

2. The method according to claim 1, wherein the amount of hydrogen peroxide is 0.02 to 0.2%.

References Cited
UNITED STATES PATENTS

| | | | |
|---|---|---|---|
| 2,064,800 | 12/1936 | Kauffmann et al. | 106—87 |
| 2,125,046 | 7/1938 | Crandell | 106—87 |
| 2,240,622 | 5/1941 | Lawson | 106—87 |

JAMES E. POER, Primary Examiner

U.S. Cl. X.R.
264—300